United States Patent
Springberg

(10) Patent No.: US 11,449,272 B1
(45) Date of Patent: Sep. 20, 2022

(54) OPERATION BASED ON CONSOLIDATED MEMORY REGION DESCRIPTION DATA

(71) Applicant: Micron Technology, Inc., Boise, ID (US)

(72) Inventor: David Matthew Springberg, Fort Collins, CO (US)

(73) Assignee: Micron Technology, Inc., Boise, ID (US)

( * ) Notice: Subject to any disclaimer, the term of this patent is extended or adjusted under 35 U.S.C. 154(b) by 3 days.

(21) Appl. No.: 17/196,584

(22) Filed: Mar. 9, 2021

(51) Int. Cl.
*G06F 3/06* (2006.01)

(52) U.S. Cl.
CPC .......... *G06F 3/0655* (2013.01); *G06F 3/0604* (2013.01); *G06F 3/0676* (2013.01); *G06F 3/0679* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–6298; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 27/00–3293; H01L 2225/00–1094; H03M 7/00–707; H04L 9/00–38; H04L 12/00–66; H04L 41/00–5096; H04L 49/00–9094; H04L 61/00–6095; H04L 67/00–42

See application file for complete search history.

(56) References Cited

U.S. PATENT DOCUMENTS 9,405,725 B2 * 8/2016 Makhervaks ............. G06F 5/14
10,019,161 B2 * 7/2018 Sharifie .................. G06F 3/0604
(Continued)

OTHER PUBLICATIONS

D. Dalessandro, A. Devulapalli and P. Wyckoff, "iSER Storage Target for Object-Based Storage Devices," Fourth International Workshop on Storage Network Architecture and Parallel I/Os (SNAPI 2007), 2007, pp. 107-113, doi: 10.1109/SNAPI.2007.10. (Year: 2007).*

(Continued)

*Primary Examiner* — Daniel C. Chappell
(74) *Attorney, Agent, or Firm* — Schwegman Lundberg & Woessner, P.A.

(57) ABSTRACT

Various embodiments enable a memory sub-system to perform a read operation based on consolidated memory region description data, which can be generated based on a memory region description data (e.g., SGL) provided by a host system for the read operation.

20 Claims, 7 Drawing Sheets

(56) References Cited

U.S. PATENT DOCUMENTS

| | | | | |
|---|---|---|---|---|
| 2009/0292861 | A1* | 11/2009 | Kanevsky | H04L 67/1097 |
| | | | | 710/28 |
| 2013/0262614 | A1* | 10/2013 | Makhervaks | G06F 15/17331 |
| | | | | 709/212 |
| 2017/0060422 | A1* | 3/2017 | Sharifie | G06F 3/0679 |
| 2019/0163409 | A1* | 5/2019 | Li | G06F 3/0604 |

OTHER PUBLICATIONS

K. Hamidouche, A. Venkatesh, A. A. Awan, H. Subramoni, C.-H. Chu and D. K. Panda, "Exploiting GPUDirect RDMA in Designing High Performance OpenSHMEM for NVIDIA GPU Clusters," 2015 IEEE International Conference on Cluster Computing, 2015, pp. 78-87, doi: 10.1109/CLUSTER.2015.21. (Year: 2015).*

C. Link, J. Sarran, G. Grigoryan, M. Kwon, M. M. Rafique and W. R. Carithers, "Container Orchestration by Kubernetes for RDMA Networking," 2019 IEEE 27th International Conference on Network Protocols (ICNP), 2019, pp. 1-2, doi: 10.1109/ICNP.2019.8888116. (Year: 2019).*

P. W. Frey and G. Alonso, "Minimizing the Hidden Cost of RDMA," 2009 29th IEEE International Conference on Distributed Computing Systems, 2009, pp. 553-560, doi: 10.1109/ICDCS.2009.32. (Year: 2009).*

NVM Express Revision 1.2.1; nvmexpress.org; Jun. 5, 2016; retrieved from https://nvmexpress.org/wp-content/uploads/NVM_Express_1_2_1_Gold_20160603.pdf on May 6, 2022 (Year: 2016).*

* cited by examiner

OPERATION BASED ON CONSOLIDATED MEMORY REGION DESCRIPTION DATA

TECHNICAL FIELD

Embodiments of the disclosure relate generally to memory devices and, more specifically, to a memory operation, such as a read operation, performed based on consolidated memory region description data.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

Non-Volatile Memory Express (NVMe) is an example of a memory protocol that supports interactions between memory sub-systems and host systems. Recent versions of the NVMe protocol support a Scatter Gather List (SGL), which is a mechanism for transferring commands and data between a host system and a memory sub-system. A SGL can facilitate processing of a read or a write request by a memory sub-system, where the SGL can describe a list of memory regions on the host system that the memory sub-system uses to send back data to the host system (e.g., over a peripheral component interconnect express (PCIe) interface) in connection with a read request, or the memory sub-system uses to obtain (e.g., read) data from the host system in connection with a write request. Each of the memory regions on the host system can function as a buffer (e.g., a SGL buffer) that the memory sub-system uses to send data back to the host system. The SGL typically comprises a linked list connecting the buffers, and each buffer can vary in size (e.g., as small as 32 bytes). In some instances, a host system establishes a large number of buffers on the host system, which can cause the buffers to be spread around local memory of the host system (e.g., based on space availability). This can result in the memory sub-system having to traverse over (e.g., walk through) the SGL often and repeatedly in connection with a single SGL-based operation.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
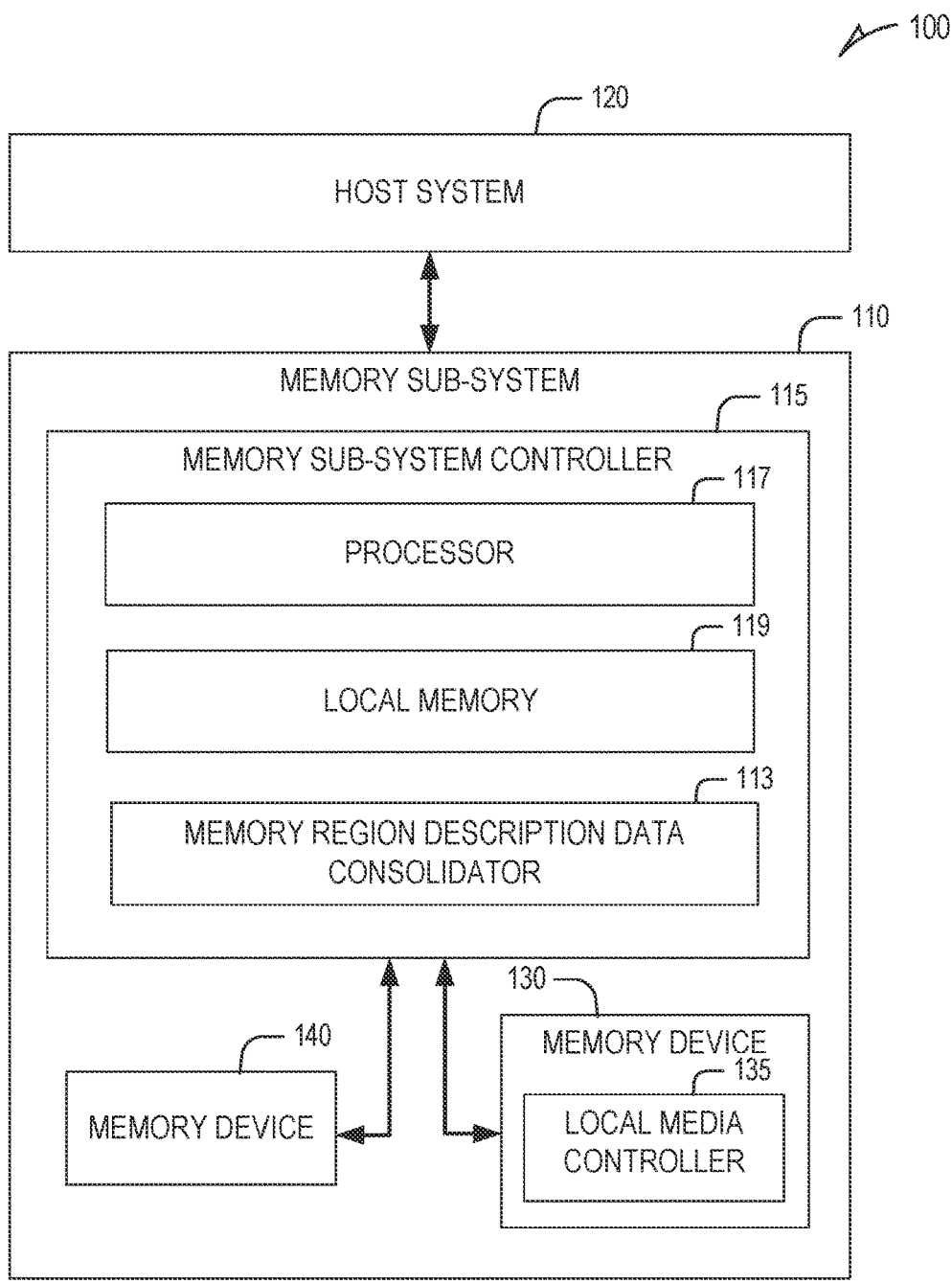
FIG. 1 is a block diagram illustrating an example computing system that includes a memory sub-system, in accordance with some embodiments of the present disclosure.

Aspects of the present disclosure are directed to a memory operation performed based on consolidated memory region data. In particular, various embodiments enable a memory sub-system to perform a memory read operation based on consolidated data describing one or more memory regions (e.g., data comprising a consolidated listing of memory regions) on a host system, where the one or more memory regions are used by the memory sub-system as one or more buffers for sending (e.g., transferring) read data to the host system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can send access requests to the memory sub-system, such as to store data at the memory sub-system and to read data from the memory sub-system.

The host system can send access requests (e.g., write command, read command) to the memory sub-system, such as to store data on a memory device at the memory sub-system, read data from the memory device on the memory sub-system, or write/read constructs (e.g., such as submission and completion queues) with respect to a memory device on the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., error-correcting code (ECC) codeword, parity code), data version (e.g., used to distinguish age of data written), valid bitmap (which LBAs or logical transfer units contain valid data), and so forth.

As used herein, a memory device can be a non-volatile memory device.

Presently, memory sub-systems can use conventional technologies to facilitate data transfers by pushing or pulling data from one or more memory regions (e.g., on a local memory) of a host system. For instance, as described herein, Non-Volatile Memory Express (NVMe) is an example of a memory protocol that supports interactions between memory sub-systems and host systems. Recent versions of the NVMe protocol support a Scatter Gather List (SGL), which is a mechanism for transferring commands and data between a host system and a memory sub-system. A host system can use Scatter Gather List (SGL) to facilitate a read request by a memory system, where the SGL can describe a list of memory regions on the host system that the memory system uses to send (e.g., transfer) the requested data back to the host system (e.g., over a peripheral component interconnect express (PCIe) interface). Each of the memory regions on the host system can function as a buffer (e.g., a SGL buffer) that the memory sub-system uses to send data back to the host system. The SGL typically comprises a linked list connecting the buffers, and each buffer can vary in size (e.g., as small as 1 byte according to a NVMe standard). In some instances, a host system establishes a large number of buffers on the host system, which can cause the buffers to be spread around local memory of the host system (e.g., based on space availability). This can result in the memory sub-system having to traverse over (e.g., walk through) the SGL often and repeatedly in connection with a single SGL-based operation.

Generally, each individual memory request (e.g., read or write request) generated by a host system can have a respective SGL stored on the host system, which the memory system can access and use in responding to the individual request. Additionally, each of the memory regions described by the SGL can be differently (e.g., variably) sized and located at different locations (e.g., logical or physical locations) on local memory of the host system. A given SGL usually comprises a list of descriptors that each describes a different memory region on the host system, and the size of the given SGL can vary based on its associated request. For instance, a host system can generate or setup a large number of small memory regions on local memory of the host system in connection with a given read request (e.g., SGL-based read request) sent to a memory system by the host system. The size and/or number of SGLs being handled by a conventional memory system at a given time can render it impossible or impractical for the memory system to concurrently store all portions of the SGLs on the memory system (e.g., at least not without increasing the memory space used on the memory system to store the SGLs). As a consequence, a conventional memory systems usually accesses (e.g., read and walk-through or traverse) a relevant SGL from the host system (e.g., as buffer space permits) multiple times when performing a memory operation in connection with the given SGL. The repeat access of the relevant SGL (and other SGLs for other memory operations) by the conventional memory system can generate a lot overhead for the conventional memory system as the related read operations are performed, which in turn can reduce operational efficiency of the conventional memory system.

Aspects of the present disclosure address the above and other deficiencies by performing a read or write operation on a memory sub-system based on consolidated memory region description data, which can be generated based on a memory region description data (e.g., SGL) provided by a host system for the read or write operation. For instance, when a host system sends a request (e.g., command) to read data from a memory sub-system, a host system can: create or setup a set of memory regions (e.g., buffers) on the host system to facilitate sending (e.g., transfer) of read data from the memory sub-system to the host system in response to the request; and generate host memory region description data (e.g., SGL for the request, where the SGL is stored on the host system) that describes the set of memory regions created/setup on the host system. In response to the request, various embodiments access the host memory region description data (e.g., SGL) from the host system. The host memory region description data can be separate from the request, stored on the host system, buffered on the memory sub-system as it is accessed from the host system, and accessed by the memory sub-system over a data bus (e.g., PCIe bus) between the host system and memory sub-system. For various embodiments, the host memory region description data is larger in data size than a buffer used on the memory sub-system to store such data in connection with a read request. Based on the host memory region description data, various embodiments identify one or more contiguous memory regions in the set of memory regions, where each contiguous memory region is formed by two or more memory regions in the set of memory regions that are located sequentially adjacent on (e.g., the local memory of) the host system. Various embodiments generate (and store on the memory sub-system) consolidated memory region description data that comprises a single memory region descriptor for each contiguous memory region identified in the list of memory regions described by the host memory region description data, and comprises a single memory descriptor for each memory region in the set of memory regions that is not part of one of the identified contiguous memory regions. In this way, the consolidated memory region description data can represent a simplified version of the host memory region description data provided by the host system.

Though various embodiments are described herein with respect to read requests from a host system or device, various embodiments support write requests in similar manner. Generally, for write requests, a memory sub-system can retrieve data from a host system in order, so the memory sub-system does not generally have to traverse (e.g., walk through) the host memory region description data (e.g., SGL) as often as for read requests. Notwithstanding, consolidated memory region description data as described herein can benefit a memory sub-system for both read and write requests, as the consolidated memory region description data can reduce storage used on the memory sub-system and can assist in data bus optimization (e.g., render better use of Transaction Layer Packets (TLPs) sent over a PCIe bus).

The consolidated memory region description data generated can be smaller in data size than the host memory region description data provided by the host system, which can enable the consolidated memory region description data to be traversed faster than the host memory region description data. Additionally, the smaller data size can permit the consolidated memory region description data to be entirely stored on (e.g., a designated buffer of) the memory sub-system when the host memory region description data cannot, thereby obviating the need for the memory sub-system to repeatedly access (e.g., read and traverse) the host memory region description data (e.g., over a PCIe data bus between the host system and the memory sub-system). Additionally, by identifying contiguous memory regions, an embodiment can enable larger data transfers that improve data bus efficiency between the host system and the memory sub-system.

As used herein, a memory region can comprise a region of memory space on a memory device (e.g., local memory) of a host system. A memory region can be used as a buffer space on the host system for receiving requested read data from a memory sub-system, or a buffer space on the host system for providing data to be written to a memory sub-system. As used herein, memory region description data can describe (e.g., as a list) one or more memory regions on a host system in connection with a request from a host system to a memory sub-system. For instance, memory region description data can comprise an entry or descriptor for each memory region. Each entry/descriptor can define a separate memory region by a memory address corresponding to a memory address space (for the individual memory region) on the memory (e.g., the local memory) of the host system, and by a memory size (e.g., size value) of the memory address space. Individual memory regions described by memory region description data can vary in size. The memory region description data can be implemented as a linked list of memory region descriptors. An example of memory region description data can include, without limitation, an SGL associated with a request sent by a host system to a memory sub-system.

Disclosed herein are some examples of performing a memory operation based on consolidated data describing one or more memory regions on a host system, as described herein.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance). Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a SATA interface, a peripheral component interconnect express (PCIe) interface, universal serial bus (USB) interface, Fibre Channel. Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, SLCs, can store one bit per cell. Other types of memory cells, such as multi-level cells (MLCs), TLCs, quad-level cells (QLCs), and penta-level cells (PLCs), can store multiple bits per cell. In some embodiments, each of the memory devices 130 can include one or more arrays of memory cells such as SLCs, MLCs, TLCs, QLCs. or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM). Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and so forth. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical memory address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

The memory sub-system controller 115 includes a memory region description data consolidator 113 that enables or facilitates various methodologies described herein on the memory sub-system 110. For instance, the memory region description data consolidator 113 can cause the memory sub-system controller 115 to generate consolidated memory region description data, on the memory sub-system 110, based on host memory region description data provided by the host system 120 in association with a request to read data from, or write data to, the memory sub-system 110. Additionally, the memory region description data consolidator 113 can cause the memory sub-system controller 115 to perform a read operation or a write operation, in response to the request, based on the generated consolidated memory region description data.

For some embodiments, the host system 120 sends a request (e.g., command) to the memory sub-system 110 to read requested data from a memory location on the memory sub-system 110 corresponding to a memory address (e.g., logical block address), or to write data to a memory location on the memory sub-system 110 corresponding to a memory address. In association with the request, the host system 120 can create or setup a set of memory regions (e.g., buffers) on the host system 120, such on local memory of the host system 120, to facilitate sending (e.g., transfer) of the requested data from the memory sub-system 110 to the host system 120 in response to the request. Additionally, in association with the request, the host system 120 can generate host memory region description data (e.g., SGL for the request) that describes the set of memory regions created/setup on the host system 120. For various embodiments, the host memory region description data is generated and stored on a memory (e.g., the local memory) of the host system 120. After receiving the request, the memory sub-system 110 can directly access the host memory region description data from the host system 120 (e.g., over a data bus, such as a PCIe bus) as needed by the memory sub-system 110 to perform the request. Generally, the data size of host memory region description data can render it impractical for the memory sub-system 110 to locally store all of the host memory region description data on a buffer of the memory sub-system 110 at once, especially when the memory sub-system 110 is concurrently handling multiple requests that each have an associated host memory region description data.

In response to the request, the memory region description data consolidator 113 can cause the memory sub-system controller 115 to access the host memory region description data (e.g., SGL) from the host system 120. The host memory region description data can be separate from the request received by the memory sub-system 110, stored on host-side memory (e.g., local memory) of the host system 120, and buffered on the memory sub-system 110 as the host memory region description data is accessed by the memory sub-system 110 from the host system 120. The host memory region description data can be accessed by the memory sub-system 110 over a data bus (e.g., PCIe bus) between the host system 120 and memory sub-system 110.

The memory region description data consolidator 113 can cause the memory sub-system controller 115 to generate consolidated memory region description data based on host memory region description data accessed by the memory sub-system 110 from the host system 120. As described herein, the host memory region description data can be larger in data size than a buffer used on the memory sub-system 110 to store such data on the memory sub-system 110. In particular, the memory region description data consolidator 113 can cause the memory sub-system controller 115 to identify one or more contiguous memory regions in a set of memory regions described by the host memory region description data, where each contiguous memory region is comprises two or more memory regions in the set of memory regions that are located sequentially adjacent on (e.g., the local memory of) the host system 120. For some embodiments, the consolidated memory region description data comprises a single descriptor (e.g., memory region descriptor) for each contiguous memory region identified in the list of memory regions described by the host memory region description data, and comprises a single memory descriptor for each memory region in the set of memory regions that is not part of one of the identified contiguous memory regions. In this way, the consolidated memory region description data can represent a simplified version of the host memory region description data provided by the host system.

According to various embodiments, the consolidated memory region description data generated is smaller in data size than the host memory region description data, and can have a data size that permits it to be stored entirely on the buffer of the memory sub-system 110. By having the consolidated memory region description data entirely stored on the memory sub-system 110, the memory sub-system 110 can locally access the consolidated memory region description data as the memory sub-system 110 sends portions of the requested data to memory regions on the host system 120 described by the consolidated memory region description data. This can enable the memory sub-system controller 115 to traverse the consolidated memory region description data faster than the host memory region description data. With local access of the consolidated memory region description data, the memory sub-system 110 can avoid the overhead of repeated access (and buffering) of the host memory region description data from the host system 120 as the memory sub-system 110 sends portions of the requested data to memory regions on the host system 120. Additionally, by identifying contiguous memory regions, the consolidated memory region description data can enable the memory sub-system controller 115 to perform larger data sends (e.g., render better use of Transaction Layer Packets (TLPs) sent over a PCIe bus) that improve data bus efficiency between the host system 120 and the memory sub-system 110.

For some embodiments, the memory region description data consolidator 113 causes the memory sub-system controller 115 to perform a read operation or a write operation, in response to the request, based on the generated consolidated memory region description data. In particular, the memory region description data consolidator 113 causes the memory sub-system controller 115 to send, to one or more of the memory devices 130, 140, a set of read commands for a set of logical block addresses where the requested data is stored on the memory sub-system 110, or a set of write commands for a set of logical block addresses where data (e.g., provided by the host system 120) is to be stored on the memory sub-system 110. With respect to a read request, the memory sub-system controller 115 can receive select data from one of the memory devices 130, 140 in response to one of the read commands (in the set of read commands) that is associated with a select logical block address in the set of logical addresses. In response to receiving the select data, the memory sub-system controller 115 can determine one or more select memory regions of the host system 120, described in the consolidated memory region description data, that are to receive the select data from the memory sub-system 110. With respect to a write request, the memory sub-system controller 115 can determine one or more select memory regions of the host system 120, described in the consolidated memory region description data, that are to provide select data to be written to one or more of the memory devices 130, 140 via the set of write commands.

Determining the one or more select memory regions of the host system 120 can comprise determining (e.g., calculating) one or more ranges of host memory addresses, corresponding to the one or more select memory regions, based on the consolidated memory region description data. The consolidate memory region can be stored on, for example, a buffer or local memory of the memory sub-system 110, such as the local memory 119 of the memory sub-system controller 115. The consolidated memory region description data can comprise a set of memory region descriptors describing a start address and memory size for each memory region, which the memory sub-system controller 115 can use to calculate one or more host memory addresses in view of the select logical block address associated with the select data received from one of the memory devices 130, 140. Specifically, the consolidated memory region description data can be indexed by a logical block address, which can facilitate determination of the host memory address. Eventually, the memory sub-system controller 115 can send the select data to a location on the local memory corresponding to the host memory address. The location on the local memory can correspond to a location within a memory region described by the consolidated memory region description data. The memory sub-system controller 115 can receive select data (representing a portion of the requested data) in response to each read command sent to the one or more memory devices 130, 140 and, for each of those select data received, the memory sub-system controller 115 can determine a host memory address and send the select data to a location (on the local memory of the host system 120) corresponding to the determined host memory address. The select data can be sent to location on the local memory, for example, using a single Transaction Layer Packet (TLP) that comprises the select data, where the single TLP can be in accordance with a Peripheral Component Interconnect Express (PCIe) standard.

Figure 2:
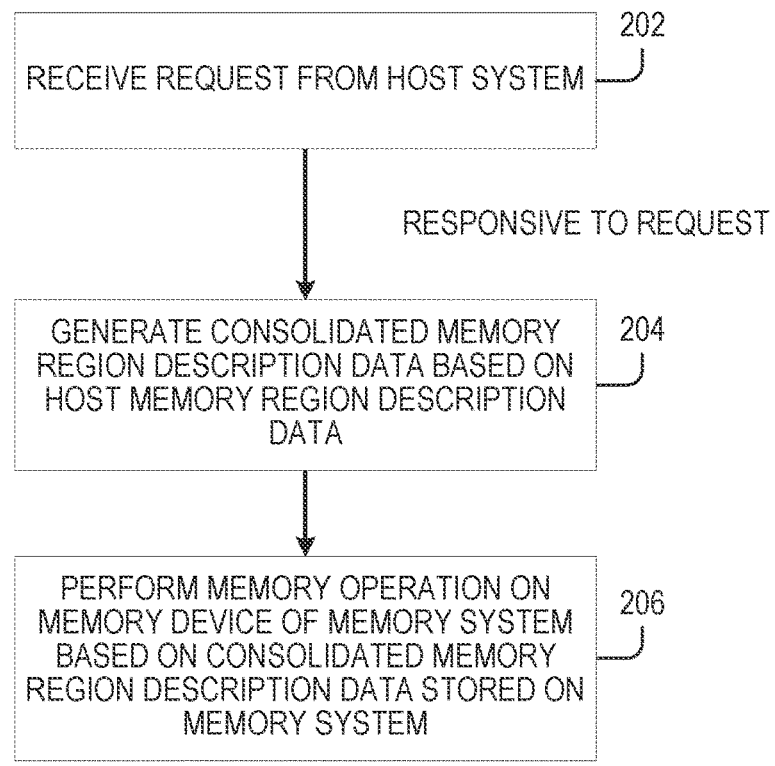
FIGS. 2 and 3 are flow diagrams of example methods for performing a memory operation based on consolidated data describing one or more memory regions on a host system, in accordance with some embodiments of the present disclosure.
Figure 3:
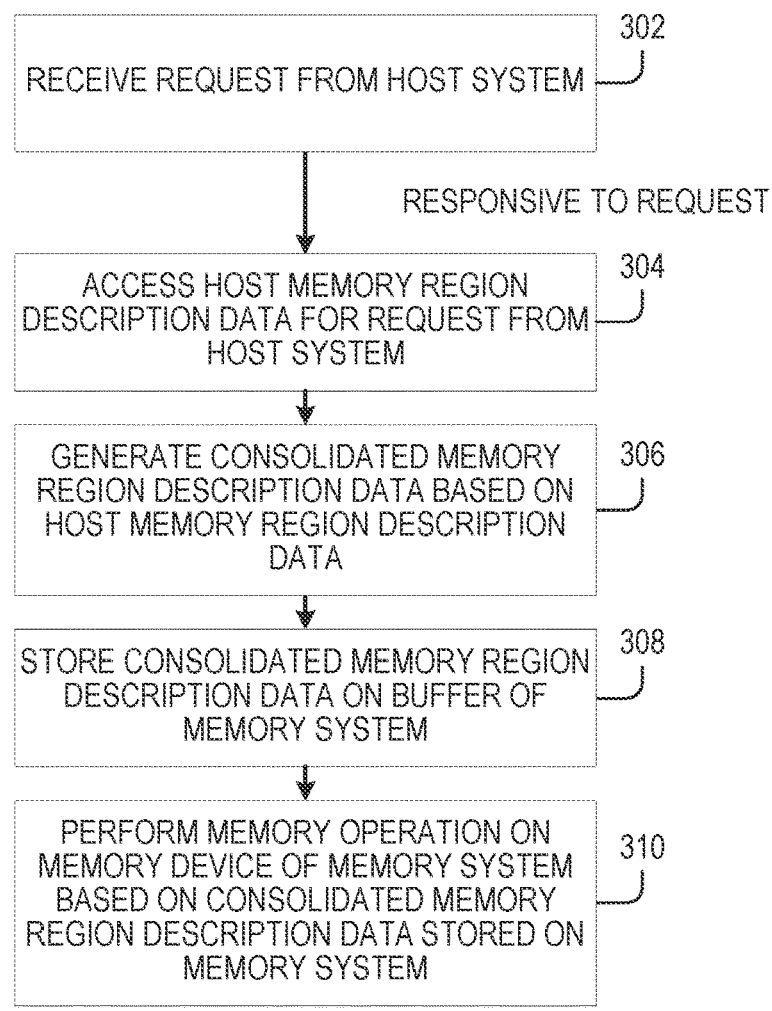

FIGS. 2 and 3 are flow diagrams of example methods for performing a memory operation based on consolidated data describing one or more memory regions on a host system, in accordance with some embodiments of the present disclosure. The methods 200, 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, at least one of the methods 200, 300 is performed by the memory sub-system controller 115 of FIG. 1 based on the memory region description data consolidator 113. Additionally, or alternatively, for some embodiments, at least one of the methods 200, 300 is performed, at least in part, by the local media controller 135 of the memory device 130 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. Other process flows are possible.

Referring now to the method 200 of FIG. 2, at operation 202, a processing device (e.g., the processor 117 of the memory sub-system controller 115) receiving, at a memory system (e.g., 130), a request from a host system (e.g., 120) to read requested data stored on the memory system (e.g., 110) or write data to the memory system. The request can be a specific type of read or write request that uses memory regions, such as an SGL read command/request. For some embodiments, the request from the host system specifies host memory region description data associated with the request. For instance, the request can specify (e.g., via a pointer to a memory location) where on the host system the host memory region description data is stored or can be accessible from. For some embodiments, each request to the memory system (e.g., 110) can be associated with its own host memory region description data. According to various embodiments, the host memory region description data describes a set of individual memory regions, of local memory of the host system, to be used by the memory system (e.g., as buffers) to send the requested data to the host system. In this way, each of memory regions can be used as a host-side buffer on the host system (e.g., 120) to receive the requested data from the memory system (e.g., 110). The host memory region description data can comprise a linked-list of memory region descriptors, where each memory region descriptor comprises a memory address (e.g., a pointer to the memory address) that corresponds to a memory address space on the local memory of the host system. As described herein, the host memory region description data can comprise an SGL associated with the request, where the SGL is in accordance with a Non-Volatile Memory Express (NVMe) protocol. The host memory region description data can be generated by the host system (e.g., 120) in connection with the request, and can stored the generated host memory region description data on memory that is local to the host system (e.g., local memory of the host system 120), where the memory can be accessed by the memory system (e.g., 110).

In response to the request, at operation 204, the processing device (e.g., 117) generates consolidated memory region description data based on the host memory region description data provided to the memory system (e.g., 110) by the host system (e.g., 120). For some embodiments, the consolidated memory region description data is generated by identifying (in the set of individual memory regions) a set of contiguous memory regions where each contiguous memory region comprises two or more sequentially adjacent memory regions of the set of individual memory regions described by the host memory region description data. For some embodiments, individual contiguous memory regions in the set of individual memory regions are identified as the host memory region description data is accessed from the host system. Each contiguous memory region can represent a largest sequence of adjacent memory regions. The two or more sequentially adjacent memory regions can be treated as a contiguous memory region. For various embodiments, the consolidated memory region description data comprises a single descriptor for each contiguous memory region in the set of contiguous memory region, and a single descriptor for each individual memory region of the set of individual memory regions that is excluded from (e.g., not part of any contiguous memory region in) the set of contiguous memory regions. For some embodiments, a new descriptor is generated in the consolidated memory region description data for each contiguous memory region in the identified set of contiguous memory region, while each of the other single descriptors in the consolidated memory region description data (for other memory regions not part of any contiguous memory region) can copied from the host memory region description data. For some embodiments, the consolidated memory region description data is indexed by a logical block address, which can facilitate determination of the host memory address. Each memory region described in the consolidated memory region description data can be defined by a start memory address corresponding to an individual memory address space (on the local memory of the host system) and a memory size of the individual memory address space. In the consolidated memory region description data, each start memory address can effectively indicate a break between the prior memory region and a start memory address. After the consolidated memory region description data has been generated on the memory system (e.g., 110), the processing device can rely on the consolidated memory region description data (in place of the host memory region description data) for processing the request from the host system, thereby obviating the need for the processing device to repeatedly access the host memory region description data as portions of the requested data is sent back to the host system (e.g., 120).

At operation 206, the processing device (e.g., 117) performs a memory operation, such as a read operation or a write operation, on one or more memory devices (e.g., 130, 140) of the memory system (e.g., 110) based on the consolidated memory region description data generated on the memory system (e.g., 110). For some embodiments, performing a read operation on the one or more memory devices (e.g., 130, 140) based on the consolidated memory region description data comprises: sending (e.g., issuing), to the memory device, a set of read commands (e.g., ten read commands) for a set of logical block addresses (e.g., ten LBAs) where the requested data is stored on the memory system (e.g., 110); and receiving select data (e.g., data from a select LBA) from the memory device in response to a select read command (in the set of read commands) for a select logical block address in the set of logical addresses.

The set of read commands are generated based on the request, and associated memory address, received from the host system (e.g., 120) by operation 202. The set of read commands can include one or more read commands to two or more memory devices of the memory system, and the set of read command can be sent over one or more memory channels to the one or more memory devices. The one or more memory devices (e.g., 130, 140) can provide a response or result for each of the read commands sent. The responses/results can be received randomly and out of order from the one or more memory devices. In response to the set of read commands, the processing device can receive a corresponding set of responses from the one or more memory devices, where each response comprises a select portion of data for the requested data. Each of the responses can indicate the logical block address that the select portion of requested data corresponds to. Each logical block corresponding to a logical block address can comprise, for example, a size of 512 bytes (512B) or 528 bytes (528B) (e.g., with extended protection information or metadata).

In response to select data received from one of the memory devices (e.g., 130, 140), the processing device can determine one or more select memory regions of the host system 120, described in the consolidated memory region description data, to receive the select data from the memory sub-system 110. For instance, the processing device can determine that the select data (e.g., LBA) received from one of the memory devices is to be sent and saved (e.g., transferred) across two or more memory regions, where one of the memory regions can receive a portion (e.g., starting portion, middle portion, or end portion) of the select data. Accordingly, based on the consolidated memory region description data, the memory system can determine (e.g., calculate) one or more ranges of host memory addresses, corresponding to the one or more select memory regions, that will receive the select data. A host memory address can correspond to a memory location (on the local memory of the host system) that falls within one of the set of individual memory regions created/setup on the host system and originally described by the host memory region description data. Eventually, the processing device can send the select data to one or more memory locations, on the local memory, corresponding to the ranges of host memory addresses. The select data can sent to location on the local memory using a single TLP that comprises the select data, where the single TLP is in accordance with a PCIe standard. To achieve more efficient use of a data bus between the memory system and the host system, for some embodiments, the single TLP comprises the select data and additional data received from the one or more memory devices in response to another read command, sent to the one or more memory devices, in association with a second read operation being performed on the one or more memory devices in response to a second request received by the memory system from the host system. The select data and the additional data can be destined for sequentially adjacent memory regions on the host system. In this way, various embodiment can optimize PCIe transfers from the memory system to the host system, and can maximize use of TLPs whenever possible.

For some embodiments, performing a write operation on the one or more memory devices (e.g., 130, 140) based on the consolidated memory region description data comprises: determining one or more select memory regions of the host system (e.g., 120), described in the consolidated memory region description data, where the one or more select memory regions are storing data to be written to the one or more memory devices (e.g., 130, 140) of the memory system (e.g., 110); retrieving the data from the one or more select memory regions; and writing the retrieved data to the one or more memory devices according to the request from the host system (e.g., 120). For instance, the processing device can write the retrieved data to the one or more memory devices by sending (e.g., issuing) to one or more of the memory devices, a set of write commands (e.g., two write commands) for a set of logical block addresses (e.g., two LBAs) corresponding to physical location to where a portion of the retrieved data is to be written.

Referring now to the method 300 of FIG. 3, at operation 302, a processing device (e.g., the processor 117 of the memory sub-system controller 115) receiving, at a memory system (e.g., 130), a request from a host system (e.g., 120) to read requested data stored on the memory system (e.g., 110) or write data to the memory system. For some embodiments, operation 302 is similar to operation 202 of the method 200 described with respect to FIG. 2.

In response to the receiving the request at operation 302, at operation 304, the processing device (e.g., 117), accesses the host memory region description data from the host system (e.g., 120). For various embodiments, the processing device (e.g., 117) accesses the host memory region description data from the host system (e.g., 120) over a data bus, such as a PCIe bus, which enables the processing devices to pull, read, and traverse the host memory region description data as needed. According to some embodiments, the processing device (e.g., 117) accesses the host memory region description data only once to facilitate operation 306.

At operation 306, the processing device (e.g., 117) generates consolidated memory region description data based on the host memory region description data provided to the memory system (e.g., 110) by the host system (e.g., 120). For some embodiments, operation 306 is similar to operation 204 of the method 200 described with respect to FIG. 2. As the consolidated memory region description data generated by operation 306, the processing device can store the consolidated memory region description data on a buffer (e.g., 119) of the memory system (e.g., 110) at operation 308.

At operation 310, the processing device (e.g., 117) performs a memory operation, such as a read operation or a write operation, on one or more memory devices (e.g., 130, 140) of the memory system (e.g., 110) based on the consolidated memory region description data generated on the memory system (e.g., 110). For some embodiments, operation 310 is similar to operation 206 of the method 200 described with respect to FIG. 2.

Figure 4:
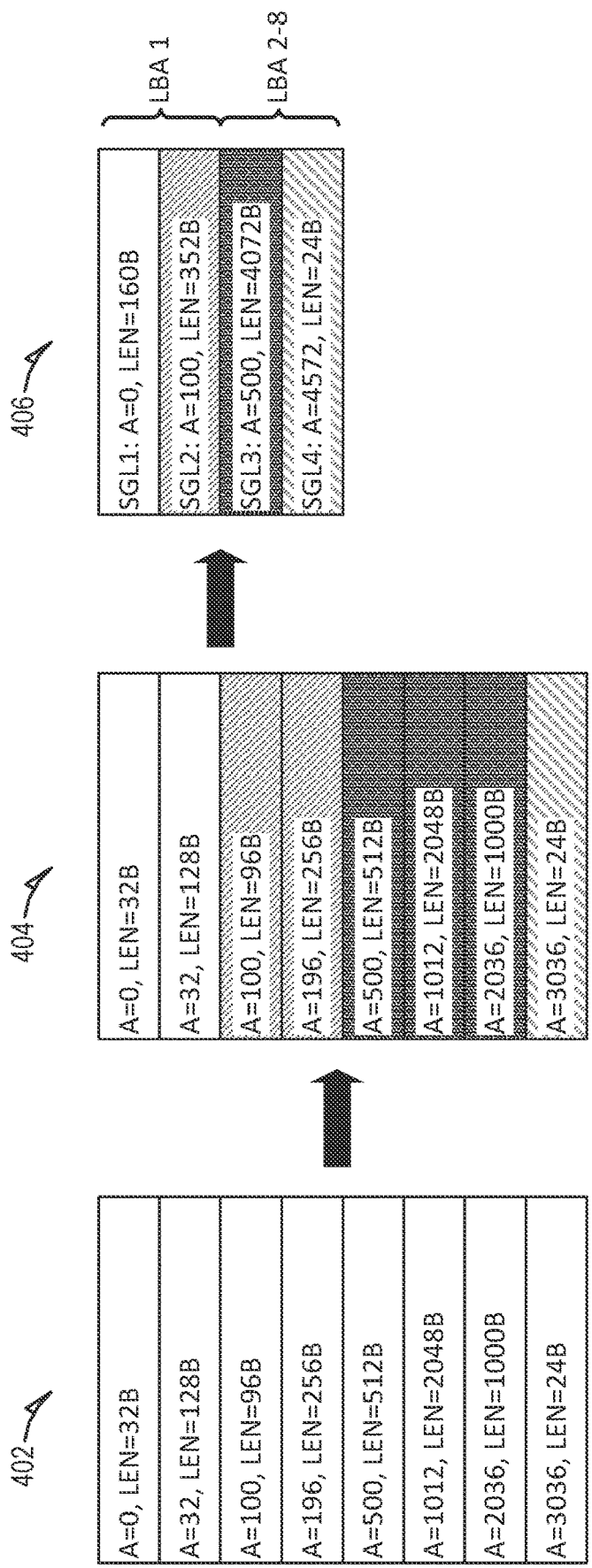
FIGS. 4 and 5 is are diagrams illustrating examples of generating consolidate memory region description data, in accordance with some embodiments of the present disclosure.
Figure 5:
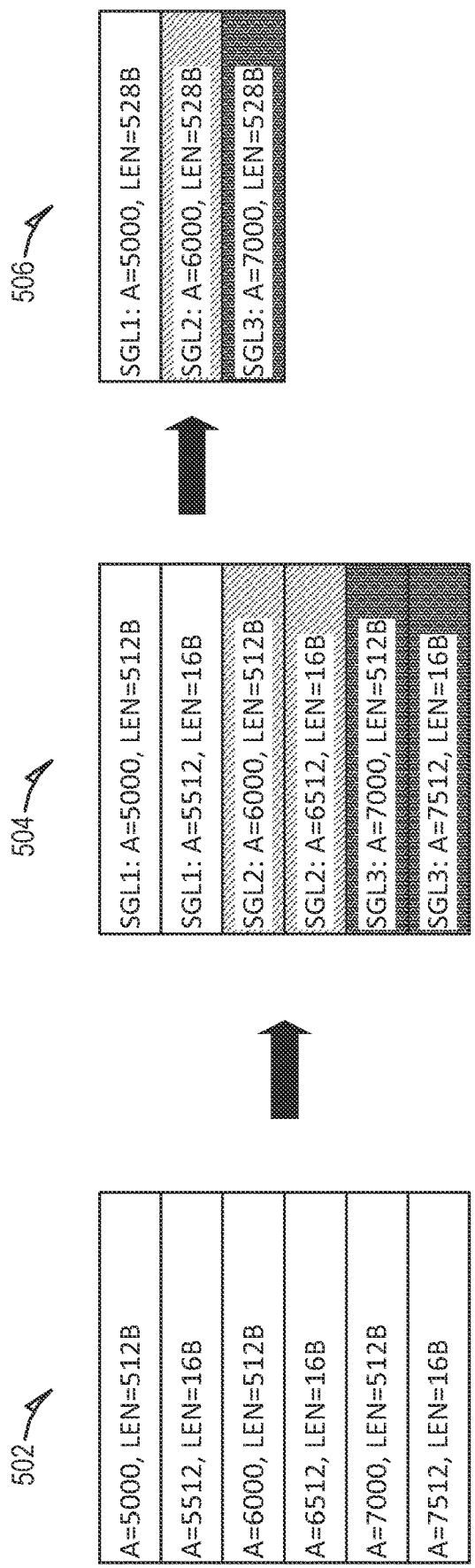

FIGS. 4 and 5 is are diagrams illustrating examples of generating consolidate memory region description data, in accordance with some embodiments of the present disclosure. Though FIGS. 4 and 5 are described with respect to performing a read operation, various embodiments support performing a write operation using consolidated memory region description data in a similar manner. FIG. 4 illustrates example host memory region description data 402 generated by a host system in connection with a request to read data from a memory system, where the request to read data can comprise multiple LBAs (eight LBAs, 1-8) of the memory system, and where each logical block has a size of 512 bytes (512B). The host memory region description data 402 can represent an SGL generated by the host system, with each memory region (e.g., SGL buffer) having a separate entry or descriptor in the SGL. As shown, the host memory region description data 402 describes eight memory regions, and describes each individual memory region by a starting address (A) of the individual memory region and a memory size (LEN) of the individual memory region. In particular, the host memory region description data 402 describes the following list of individual memory regions: the first memory region (A=0, LEN=32B); the second memory region (A=32, LEN=128B); the third memory region (A=100, LEN=96B); the fourth memory region (A=196, LEN=256B); the fifth memory region (A=500, LEN=512B); the sixth memory region (A=1012, LEN=2048B); the seventh memory region (A=2036, LEN=1000B); and the eight memory region (A=3036, LEN=24B).

Host memory region description data 404 illustrates the host memory region description data 402 after one or more contiguous memory regions have been identified in accordance with some embodiments. In particular, the following contiguous memory regions are identified in the list of memory regions described by the host memory region description data 402: a first contiguous memory region comprising the first memory region (A=0, LEN=32B) and the second memory region (A=32, LEN=128B); a second contiguous memory region comprising the third memory region (A=100, LEN=96B) and the fourth memory region (A=196, LEN=256B); and a third contiguous memory region comprising the fifth memory region (A=500, LEN=512B), the sixth memory region (A=1012, LEN=2048B), and the seventh memory region (A=2036, LEN=1000B).

Based on the host memory region description data 404 and the one or more identified contiguous memory regions, the memory system can generate consolidated memory region description data 406. In particular, the memory system can generate the consolidated memory region description data 406 such that there is a single entry/descriptor for each of the first, second and third contiguous memory regions, and a single entry/descriptor for the remaining memory region (the eighth memory region) that is not part of any of the identified contiguous memory regions. As a shown, the consolidated memory region description data 406 comprises a single entry/descriptor for each of the following: the first contiguous memory region having a starting address of 0 (A=0) and a memory size of 160B (LEN=160B); the second contiguous memory region having a starting address of 100 (A=100) and a memory size of 352B (LEN=352B); the third contiguous memory region having a starting address of 500 (A=500) and a memory size of 4072B (LEN=4072B); and the eighth memory region still having a starting address of 3036 (A=3036) and a memory size of 24B (LEN=24B), which is the same as described by the host memory region description data 402.

As described herein, based on the consolidated memory region description data 406, the memory system can determine (e.g., calculate) one or more select memory regions for sending (e.g., transferring) a LBA (received from/returned by one of the memory devices) to the host system in response to the request to read data. For instance, in response to the request, eight read commands, for eight different LBAs, can be are sent to one or more memory devices of the memory system to retrieve the read data requested by the host system, where each logical block can have a size of 512B. As described herein, response/results from the one or more memory devices can be received out of order (e.g., randomly). Where the eight LBA (LBA 8) is returned by the one or more memory devices, the memory system can determine one or more select memory regions of the host system that are to receive LBA 8. AS described herein, the consolidated memory region description data 406 can be indexed by the ordinal number of the LBA returned by the one or more memory devices. For instance, based on the consolidated memory region description data 406, the memory system can determine that a starting host memory address for LBA 8 as follows:

$$500+(8-1)\times 512B=4084,$$

where the 8 represents the eighth LBA (LBA 8). Additionally, based on the consolidated memory region description data 406, the memory system can determine: that the host memory address of 4084 falls within the third contiguous memory region, which has a start memory address of 500 and an end memory address of 45721 and that LBA 8 will be sent and saved (e.g., transferred) across the third contiguous memory region (starting at the host memory address of 4084 and ending at the host memory address of 4572) and the eighth memory region (starting at host memory address 4572 and ending at the host memory address of 4596). As a result, the memory system can send (e.g., transfer or move) 488B of LBA 8 from the memory system to memory space, on the host system, starting at a memory location corresponding to host memory address 4084 and ending at a memory location corresponding to host memory address 4572. Additionally, the memory system would send (e.g., transfer or move) the remaining 24B of LBA 8 from the memory system to memory space, on the host system, starting at a memory location corresponding to host memory address 4572 and ending at a memory location corresponding to host memory address 4596.

Continuing with this example, where the first LBA (LBA 1) is returned by the one or more memory devices, the memory system can determine that the first contiguous memory region (starting at the host memory address of 0 and ending at the host memory address of 512) of the host system is to receive LBA 1. In particular, based on the consolidated memory region description data 406, the memory system can determine that a starting host memory address for LBA 1 as follows:

$$500+(1-1)\times 512B=0,$$

where the I represents the eighth LBA (LBA 1). As a result, the memory system can send (e.g., transfer or move) 512B of LBA 1 from the memory system to memory space, on the host system, starting at a memory location corresponding to host memory address 0 and ending at a memory location corresponding to host memory address 512. As shown, sending of LBA 1 does not cross into another memory region (i.e., LBA 1 fits within the first contiguous memory region).

FIG. 5 illustrates example host memory region description data 502 generated by a host system in connection with a request to read data from a memory system, where the request to read data can comprise multiple LBAs (three LBAs, 1-3) of the memory system, and where each logical block has a size of 528 bytes (528B). Like the host memory region description data 402 of FIG. 4, the host memory region description data 502 can represent an SGL generated by the host system, with each memory region (e.g., SGL buffer) having a separate entry or descriptor in the SGL. As shown, the host memory region description data 502 describes the following list of individual memory regions: the first memory region (A=5000, LEN=512B); the second memory region (A=5512, LEN=16B); the third memory region (A=6000. LEN=512B); the fourth memory region (A=6512, LEN=16B); the fifth memory region (A=7000, LEN=512B); and the sixth memory region (A=7512, LEN=512B).

Host memory region description data 504 (illustrating the host memory region description data 502 after one or more contiguous memory regions have been identified in accordance with some embodiments) identifies the following contiguous memory regions: a first contiguous memory region comprising the first memory region (A=5000, LEN=512B) and the second memory region (A=5512, LEN=16B); a second contiguous memory region comprising the third memory region (A=6000, LEN=512B) and the fourth memory region (A=6512, LEN=16B); and a third contiguous memory region comprising the fifth memory region (A=7000. LEN=512B) and the sixth memory region (A=7512, LEN=512B).

Based on the host memory region description data 504 and the one or more identified contiguous memory regions, the memory system can generate consolidated memory region description data 506. In particular, the memory system can generate the consolidated memory region description data 506 such that there is a single entry/descriptor for each of the first, second and third contiguous memory regions. As a shown, the consolidated memory region description data 506 comprises a single entry/descriptor for each of the following: the first contiguous memory region having a starting address of 5000 (A=5000) and a memory size of 528B (LEN=528B); the second contiguous memory region having a starting address of 6000 (A=6000) and a memory size of 528B (LEN=528B); and the third contiguous memory region having a starting address of 7000 (A=7000) and a memory size of 528B (LEN=528B).

Figure 6:
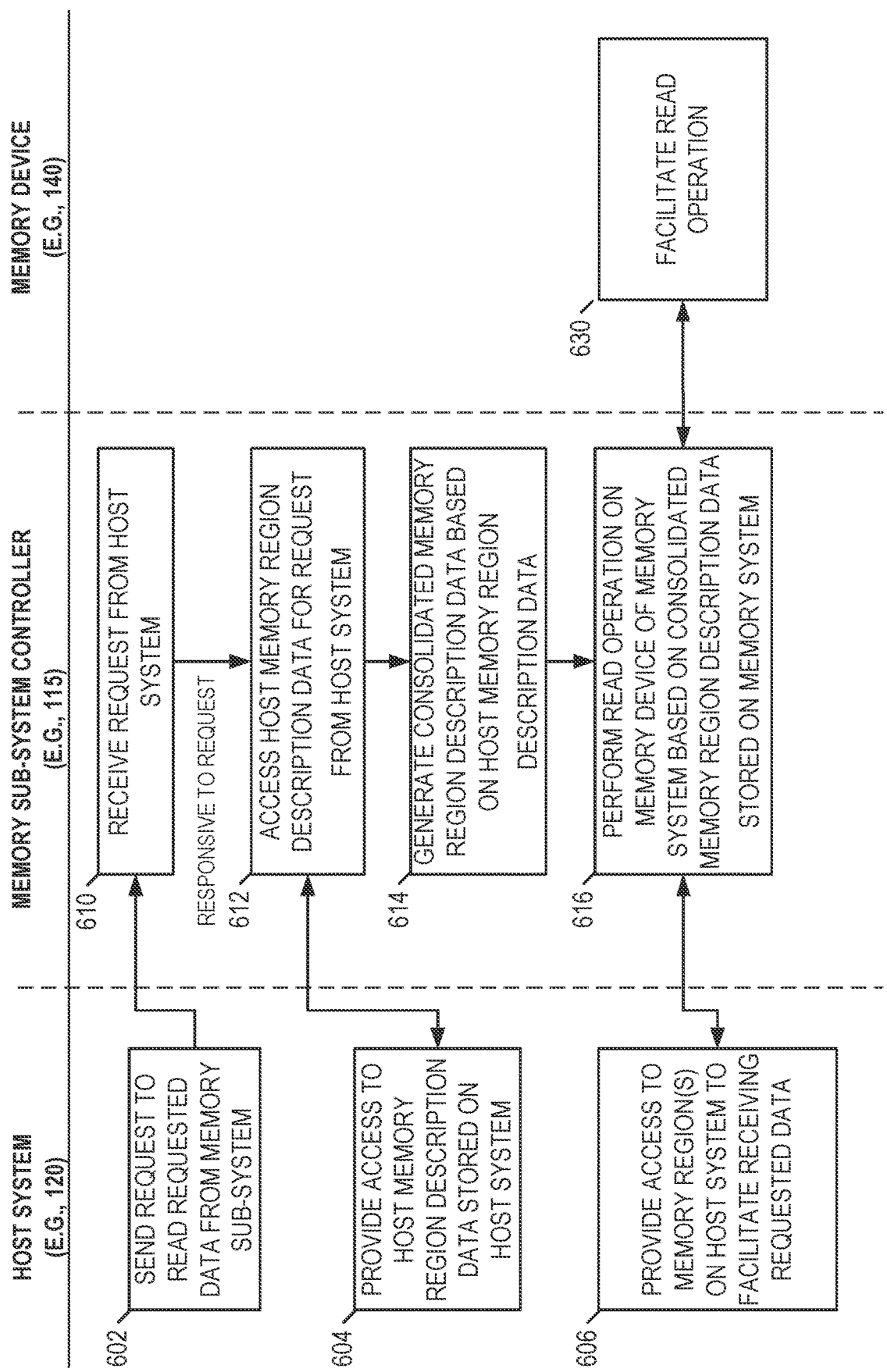
FIG. 6 provide an interaction diagram illustrating interactions between components of a computing environment in the context of some embodiments in which a method for performing a memory read performing a memory read operation based on consolidated data describing one or more memory regions on a host system as described herein is performed.

FIG. 6 provide an interaction diagram illustrating interactions between components of a computing environment in the context of some embodiments in which a method for performing a memory read performing a memory read operation based on consolidated data describing one or more memory regions on a host system as described herein is performed. Though FIG. 6 illustrates performing a memory read in accordance with various embodiments, some embodiments support performing a memory write based on consolidated data (describing one or more memory regions on a host system) in a similar manner. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by a host system (e.g., 120), a memory sub-system controller (e.g., 115), a memory device (e.g., 130 or 140), or some combination thereof. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. In the context of the example illustrated in FIG. 6, the host system can include the host system 120, the memory sub-system controller can include the memory sub-system controller 115, and the memory device can include the memory device 140.

As shown in FIG. 6, at operation 602, the memory sub-system controller 115 sends a request to read requested data from the memory sub-system 110, where the request specifies host memory region description data associated with the request, where the host memory region description data describes a set of individual memory regions, of local memory of the host system 120, to be used to send (e.g., transfer) the requested data to the host system 120. At operation 610, the memory sub-system controller 115 receives the request from the host system and, in response, the memory sub-system controller 115 accesses the host memory region description data from the host system 120 (e.g., over PCIe bus) at operation 612. The host system 120, at operation 604, provides the memory sub-system 110 access to the host memory region description data stored on the host system 120.

Based on the accessed host memory region description data, at operation 614, the memory sub-system controller 115 generates consolidated memory region description data by identifying a set of contiguous memory regions that each comprise two or more sequentially adjacent memory regions of the set of individual memory regions (described by the accessed host memory region description data). The memory sub-system controller 115, at operation 616, performs a read operation on the memory device 140 based on the consolidated memory region description data generated by the memory sub-system controller 115. At operation 630, the memory devices 140 facilitates the read operation by the memory sub-system controller 115, where the memory device 140 can perform one or more read commands issued to the memory device 140 by the memory sub-system controller 115 in connection with the read operation. Additionally, at operation 606, the host system 120 provides access to one or more memory regions on the host system 120 to facilitate receiving the requested data (by the memory sub-system controller 115) from the memory sub-system 110 to the host system 120.

Figure 7:
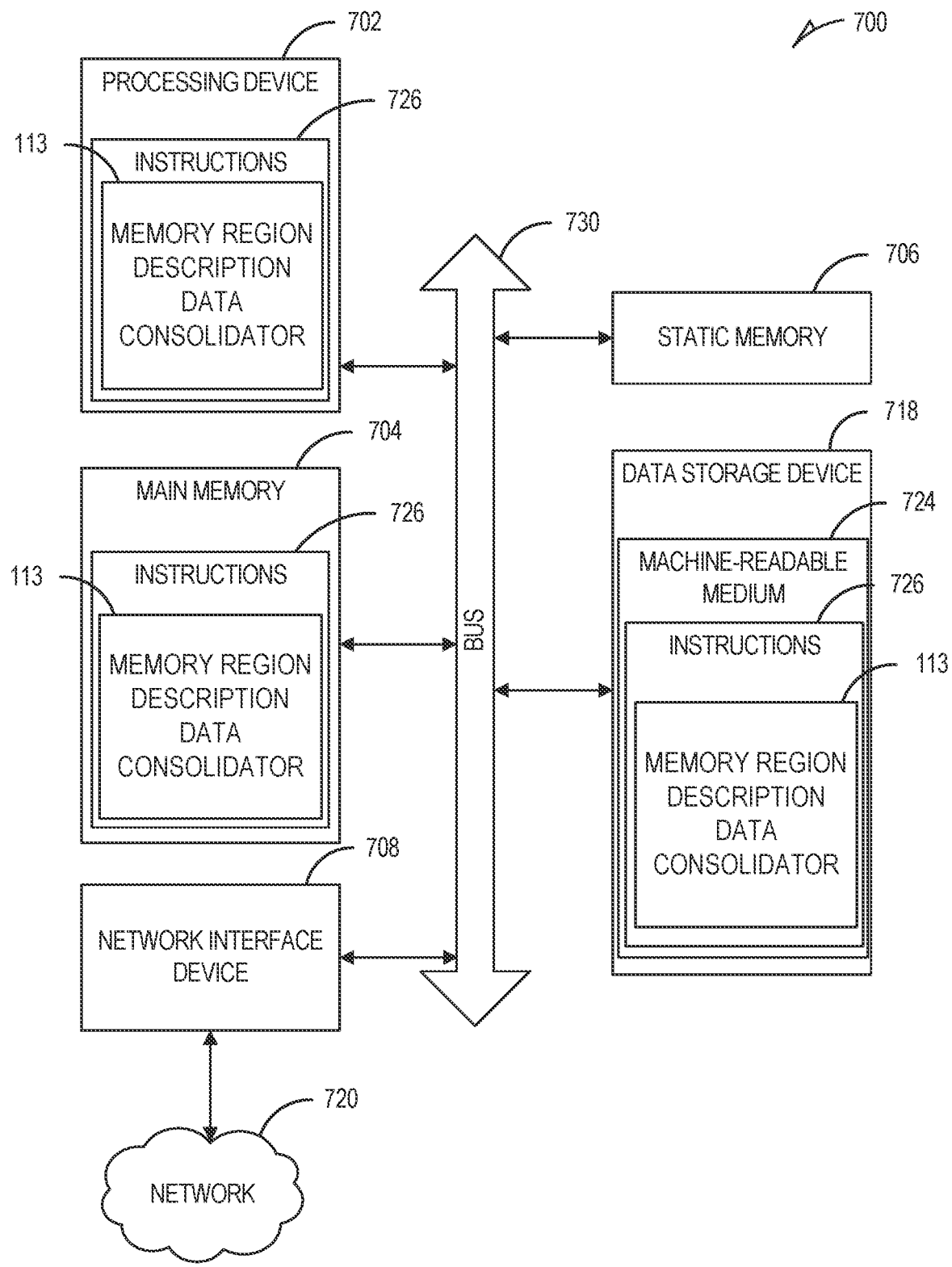
FIG. 7 is a block diagram of an example computer system in which embodiments of the present disclosure may operate.

FIG. 7 illustrates an example machine in the form of a computer system 700 within which a set of instructions can be executed for causing the machine to perform any one or more of the methodologies discussed herein. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

The processing device 702 represents one or more general-purpose processing devices such as a microprocessor, a central processing unit, or the like. More particularly, the processing device 702 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 702 can also be one or more special-purpose processing devices such as an application-specific integrated circuit (ASIC), a field programmable gate array (FPGA), a digital signal processor (DSP), a network processor, or the like. The processing device 702 is configured to execute instructions 726 for performing the operations and steps discussed herein. The computer system 700 can further include a network interface device 708 to communicate over a network 720.

The data storage device 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage device 718, and/or main memory 704 can correspond to the memory sub-system 110 of FIG. 1.

In one embodiment, the instructions 726 include instructions to implement functionality corresponding to performing a memory read performing a memory read operation based on consolidated data describing one or more memory regions on a host system as described herein (e.g., the memory region description data consolidator 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, read-only memories (ROMs), random access memories (RAMs). EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory system comprising:

a memory device; and a processing device, operatively coupled to the memory device, configured to perform operations comprising:

receiving a first request from a host system to read requested first data stored on the memory system, the first request specifying first memory region description data associated with the first request, the first memory region description data describing a first set of individual memory regions, of the host system, to which the requested first data is to be sent; and in response to the first request:

based on the first memory region description data, generating first consolidated memory region description data by identifying a first set of contiguous memory regions that each comprise two or more sequentially adjacent memory regions of the first set of individual memory regions, the first consolidated memory region description data comprising:

a single descriptor for each contiguous memory region in the first set of contiguous memory regions; and a single descriptor for each individual memory region of the first set of individual memory regions that is excluded from the first set of contiguous memory regions; and performing a first read operation on the memory device based on the first consolidated memory region description data generated on the memory system.

2. The memory system of claim 1, wherein the generating the consolidated memory description data comprises:
generating the single descriptor for each contiguous memory region in the first set of contiguous memory regions.

3. The memory system of claim 1, wherein the first memory region description data is stored on the host system, the operations comprising:
accessing the first memory region description data from the host system.

4. The memory system of claim 1, wherein the first memory region description data comprises a linked-list of memory region descriptors, each memory region descriptor comprising a memory address that corresponds to a memory address space on local memory of the host system.

5. The memory system of claim 1, wherein the first memory region description data comprises a Scatter Gather List (SGL) in accordance with a Non-Volatile Memory Express (NVMe) protocol.

6. The memory system of claim 1, wherein each individual memory region of the first set of individual memory regions is defined by:
a memory address corresponding to an individual memory address space on local memory of the host system; and
a memory size of the individual memory address space.

7. The memory system of claim 1, wherein each memory region in the first set of memory regions comprises an individual memory address space on local memory of the host system.

8. The memory system of claim 1, wherein the performing the first read operation on the memory device based on the first consolidated memory region description data stored on the memory system comprises:
sending, to the memory device, a set of read commands for a set of logical block addresses where the requested first data is stored on the memory system;
receiving select data from the memory device in response to a select read command in the set of read commands, the select read command being for a select logical block address in the set of logical addresses; and
in response to receiving the select data:
based on the select logical block address and the first consolidated memory region description data, determining a set of select memory regions on the host system to receive the select data; and
sending the select data to the set of select memory regions.

9. The memory system of claim 8, wherein the select data is sent to location on local memory using a single Transaction Layer Packet (TLP) that comprises the select data, the single Transaction Layer Packet being in accordance with a Peripheral Component Interconnect Express (PCIe) standard.

10. The memory system of claim 9, wherein the single Transaction Layer Packet comprises additional data received from the memory device in response to another read command sent to the memory device, the other read command being associated with a second read operation being performed on the memory device, the second read operation being performed in response to a second request received by the memory system from the host system.

11. The memory system of claim 1, wherein the operations comprise:
receiving a second request to read requested second data stored on the memory system, the second request specifying second memory region description data associated with the second request, the second memory region description data describing a second set of individual memory regions, of the host system, to which the requested second data is to be sent; and
in response to the second request:
generating second consolidated memory region description data by identifying a second set of contiguous memory regions that each comprise two or more sequentially adjacent memory regions of the first set of individual memory regions, the second consolidated memory region description data comprising:
a single descriptor for each contiguous memory region in the second set of contiguous memory regions; and
a single descriptor for each individual memory region of the second set of individual memory regions that is excluded from the second set of contiguous memory regions; and
performing a second read operation on the memory device based on the second consolidated memory region description data stored on the memory system.

12. The memory system of claim 1, wherein the rust memory region description data is generated by the host system for the first request.

13. The memory system of claim 1, wherein the identifying the first set of contiguous memory regions comprises identifying individual contiguous memory regions in the first set of individual memory regions as the first memory region description data is accessed from the host system.

14. The memory system of claim 1, comprising:
a buffer to store the first set of memory region descriptors generated by the memory system.

15. The memory system of claim 14, comprising:
a memory controller that comprises the processing device and the buffer.

16. A method comprising:
receiving, at a memory system, a request from a host system to read requested data stored on the memory system, the request specifying host memory region description data associated with the request, the host memory region description data describing a set of individual memory regions, of the host system, to which the requested data is to be sent; and
in response to the request:
accessing the host memory region description data from the host system;
generating consolidated memory region description data by identifying a set of contiguous memory regions that each comprise two or more sequentially adjacent memory regions of the set of individual memory regions, the consolidated memory region description data comprising:
a single descriptor for each contiguous memory region in the set of contiguous memory regions; and
a single descriptor for each individual memory region of the set of individual memory regions that is excluded from the set of contiguous memory regions; and
storing the consolidated memory region description data on a buffer of the memory system.

17. The method of claim 16, comprising, in response to the request:
performing a read operation on a memory device of the memory system based on the consolidated memory region description data stored on the buffer.

18. The method of claim 16, wherein the host memory region description data comprises a linked-list of memory region descriptors, each memory region descriptor comprising a memory address that corresponds to a memory address space on local memory of the host system.

19. The method of claim 16, wherein the host memory region description data comprises a Scatter Gather List (SGL) in accordance with a Non-Volatile Memory Express (NVMe) protocol.

20. At least one non-transitory machine-readable storage medium comprising instructions that, when executed by a processing device of a memory system, cause the processing device to perform operations comprising:

receiving a request from a host system to read requested data stored on the memory system, the request specifying host memory region description data associated with the request, the host memory region description data describing a set of individual memory regions, of the host system, to which the requested data is to be sent; and in response to the request:

based on the host memory region description data, generating consolidated memory region description data by identifying a set of contiguous memory regions that each comprise two or more sequentially adjacent memory regions of the set of individual memory regions, the consolidated memory region description data comprising:

a single descriptor for each contiguous memory region in the set of contiguous memory regions; and a single descriptor for each individual memory region of the set of individual memory regions that is excluded from the set of contiguous memory regions; and storing the consolidated memory region description data on a buffer of the memory system.

\* \* \* \* \*